(12) United States Patent
Norman

(10) Patent No.: US 9,433,200 B2
(45) Date of Patent: Sep. 6, 2016

(54) FISHING EQUIPMENT COOLER DEVICE

(71) Applicant: Marcel Norman, Pittsburgh, PA (US)

(72) Inventor: Marcel Norman, Pittsburgh, PA (US)

(*) Notice: Subject to any disclaimer, the term of this patent is extended or adjusted under 35 U.S.C. 154(b) by 157 days.

(21) Appl. No.: 14/554,203

(22) Filed: Nov. 26, 2014

(65) Prior Publication Data
US 2015/0150231 A1 Jun. 4, 2015

Related U.S. Application Data

(60) Provisional application No. 61/911,617, filed on Dec. 4, 2013.

(51) Int. Cl.
*A01K 97/04* (2006.01)
*A01K 97/08* (2006.01)
*A01K 97/20* (2006.01)
*A01K 97/22* (2006.01)

(52) U.S. Cl.
CPC .............. *A01K 97/04* (2013.01); *A01K 97/08* (2013.01); *A01K 97/20* (2013.01); *A01K 97/22* (2013.01)

(58) Field of Classification Search
USPC .................. 43/54.1; 206/315.11; 280/47.34
See application file for complete search history.

(56) References Cited

U.S. PATENT DOCUMENTS

| | | | |
|---|---|---|---|
| 4,541,539 A | 9/1985 | Matthews | |
| 5,305,544 A * | 4/1994 | Testa, Jr. | A01K 97/05 206/315.11 |
| 5,454,634 A | 10/1995 | Herbst | |
| 5,699,925 A | 12/1997 | Petruzzi | |
| 5,755,057 A * | 5/1998 | Dancer | A01K 97/06 206/315.11 |
| 6,185,860 B1 | 2/2001 | Thibodeaux | |
| 6,237,765 B1 * | 5/2001 | Hagen | A01K 97/05 206/315.11 |
| 6,431,580 B1 * | 8/2002 | Kady | B62B 1/12 280/655 |
| 6,467,779 B1 | 10/2002 | Mills | |
| 6,962,354 B1 * | 11/2005 | Miller | A01K 97/08 280/47.26 |
| 7,384,051 B1 * | 6/2008 | Haire | A01K 97/05 280/47.34 |
| 7,389,608 B1 * | 6/2008 | MacKay | A01K 97/05 206/315.11 |
| 7,481,065 B2 | 1/2009 | Krieger | |
| 8,695,372 B1 * | 4/2014 | Dyal | F25D 3/08 62/457.4 |
| 2006/0186642 A1 * | 8/2006 | Kady | A01K 97/06 280/652 |
| 2010/0072215 A1 * | 3/2010 | Coon | A45C 13/30 220/735 |
| 2011/0239525 A1 * | 10/2011 | Morales | A01K 97/06 43/54.1 |

* cited by examiner

*Primary Examiner* — Christopher P Ellis
(74) *Attorney, Agent, or Firm* — Global Intellectual Property Agency, LLC; Daniel Boudwin

(57) ABSTRACT

A fishing equipment cooler device is provided having a multi-chambered cooler interior and a separable construction. An upper cooler assembly removably attaches to a lower cooler assembly, whereby each is capable of supported chilled items therein in a segregated configuration. Each cooler assembly is insulated, while external fishing rod support members are employed to support fishing rods and other equipment in an upright condition from the sidewalls of the coolers. The lower cooler assembly further comprises roller wheels and an adjustable handle grip such that the cooler device can be readily transported without carrying. The preferred removable connection between the coolers is a turn latch mechanism. Overall, the device allows fisherman and outdoorsman to store food, bait, tackle, caught fish, and other supplies in insulated and segregated chambers.

6 Claims, 4 Drawing Sheets

FISHING EQUIPMENT COOLER DEVICE

CROSS REFERENCE TO RELATED APPLICATION

This application claims the benefit of U.S. Provisional Application No. 61/911,617 filed on Dec. 4, 2013. The above identified patent application is herein incorporated by reference in its entirety to provide continuity of disclosure.

BACKGROUND OF THE INVENTION

1. Field of the Invention

The present invention relates to fishing accessories and cooler devices. More specifically, the present invention relates to a modular cooler device that offers separated storage of chilled items and attachments for fishing gear.

Coolers are well known items in the art, which are generally used to store and transport chilled items and perishable items that require cooling. These devices generally comprise an insulated compartment filled with a cooling medium, which generally may be a quantity of ice and one or more chemical ice blocks. The cooler structure insulates the interior such that the interior can remain cool while the warm outside air does not rapidly penetrate and warm the cooler contents.

For outdoor sporting activities such as fishing, a user may transport several perishable items to and from the fishing area. These include food and drink for the fisherman, bait for the fishing activity, and even caught fish that have to be stored on ice to prevent decomposition. An issue arises when more than one of these items must be transported at once. Ideally these items should not be comingled within the same cooler compartment, therefore several coolers are necessary. However, it can be burdensome to travel to remote fishing areas with more than one cooler filled with ice. Therefore, the present invention contemplates a multi-chambered cooler for individually storing fishing items and supplies, whereby more than one cooler compartment is provided on a mobile chassis.

Specifically, the present invention pertains to a double-chamber cooler assembly that is transportable using a set of wheels and a handle grip portion. The dual-chamber design allows food items, caught fish, bait, or other items to be separately stored and cooled without interaction. An upper cooler assembly is mounted to a lower cooler assembly, whereby the two secure to one another in a static arrangement. The lower cooler assembly comprises wheels and the handle grip portion, while fishing gear supports and an external lighting source are provided along the exterior of the assembly for supporting fishing activities. Overall, the assembly provides a means to transport food and supplies, while also offering separated storage of chilled items using one assembly.

2. Description of the Prior Art

Devices have been disclosed in the prior art that relate to fishing equipment and cooler device. These include devices that have been patented and published in patent application publications. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 6,467,779 to Mills, which discloses a combination ice cooler and fishing rod holder, whereby the cooler comprises a standard cooler member with sidewalls and a removable lid. Along the sides of the cooler is a plurality of tubular fishing rod holders that are adapted to receive the lower ends of fishing rods therein. The rod holders support fishing rods in an upright condition while the cooler provides an insulated member to store ice, food, and caught fish. The Mills device provides a cooler that can support fishing rods; however the construction of the assembly does not facilitate a multi-chamber interior in a stacked and removable manner. The present invention can be broken down into two smaller cooler units, whereby fresh food and beverages can be stored in one area, while caught fish are separated into the second area.

Similar to Mills, U.S. Pat. No. 4,541,539 to Matthews discloses a fisherman's cooler that comprises a tackle box, cutting board upper, built-in fishing rod holders, and a cooler area. The cooler is internally compartmented and removably attaches to the tackle box along the upper portion thereof. The Matthews device provides a multi-function cooler and fisherman assembly; however it fails to anticipate the dual cooler compartment construction of the present invention.

U.S. Pat. No. 7,389,608 to MacKay discloses a fishing chest that is adapted to support one or more fishing rods and provide a cooler for storing bait and caught fish. The cooler is segmented into two sections to allow the bait and fish to be stored separately, while the construction of the assembly comprises a standard, rolled chest with an interior divider. Similar to the aforementioned devices, the MacKay device provides a cooler with additional elements for fishing purposes and an internal divider. The present invention provides a stackable construction for separated storage of fish, bait, and other supplies in independently insulated environments.

U.S. Pat. No. 7,481,065 to Krieger discloses a cooler that is expandable in structure and can extend outwards to provide a second storage cavity. The expandable portion is deployable from the insulated portion and can be subdivided into several different volumes. A tether secures the insulated and expanded portions together. The Krieger device is one that expands from one state to an enlarged state. The present invention contemplates a stackable, dual-chamber cooler system that provides separate insulated volumes for different food stuffs, bait, fishing supplies, and/or caught fish.

U.S. Pat. No. 5,699,925 to Petruzzi discloses an interlocking and stackable container assembly that can be used to stack a plurality of like containers on top of one another and lock the containers together in a static state. A tongue and groove attachment is provided between the stacked containers, wherein the lid of an underlying container is secured to the base of another container positioned thereabove. While providing an assembly that facilitates stacked containers, the Petruzzi containers do not contemplate the same connection means, and moreover do not allow access to the container interiors when in a stacked state. The present invention contemplates stackable insulated coolers that are accessible when connected and useful during camping and/or fishing activities.

Finally, U.S. Pat. No. 5,454,634 to Herbst discloses yet another container stacking system, wherein an interlocking frame is deployed between containers to allow attachment of containers from the upper, lower, and side portions of the container. In this way, containers can be stacked vertically and to adjacent containers. Similar to Petruzzi, the Herbst construction diverges from the construction and intent of the present invention, which is related to stackable coolers for a dual-zone cooler assembly supporting fishing and other outdoor activities.

The present invention comprises a multi-chamber cooler device that includes separate cooling compartments for storing and transporting chilled items therein. The device includes a stacked cooler construction having a lower cooler assembly and an upper cooler assembly, while the device is adapted to be readily transportable to a fishing location. It is submitted that the present invention substantially diverges in design elements from the prior art, and consequently it is clear that there is a need in the art for an improvement to existing fishing equipment cooler devices. In this regard the instant invention substantially fulfills these needs.

SUMMARY OF THE INVENTION

In view of the foregoing disadvantages inherent in the known types of fishing equipment cooler devices now present in the prior art, the present invention provides a new cooler device that can be utilized for providing convenience for the user when storing and transporting chilled items while on a fishing expedition.

It is therefore an object of the present invention to provide a new and improved fishing equipment cooler device that has all of the advantages of the prior art and none of the disadvantages.

It is another object of the present invention to provide a fishing equipment cooler device that provides a first and second cooling chamber for segregated cooling of different items, such as food, bait, fish, and other items.

Another object of the present invention is to provide a fishing equipment cooler device that includes a set of roller wheel and a handle grip portion such that the device can be easily transported to a desired location.

Yet another object of the present invention is to provide a fishing equipment cooler device that contemplates a separable first and second cooler assembly for modular use thereof.

Another object of the present invention is to provide a fishing equipment cooler device that supports fishing equipment, such as rods, nets, and other tools along the sides of the device.

Another object of the present invention is to provide a fishing equipment cooler device that requires not electric power and one that insulates at least two interior compartments for temporary storage of chilled items.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
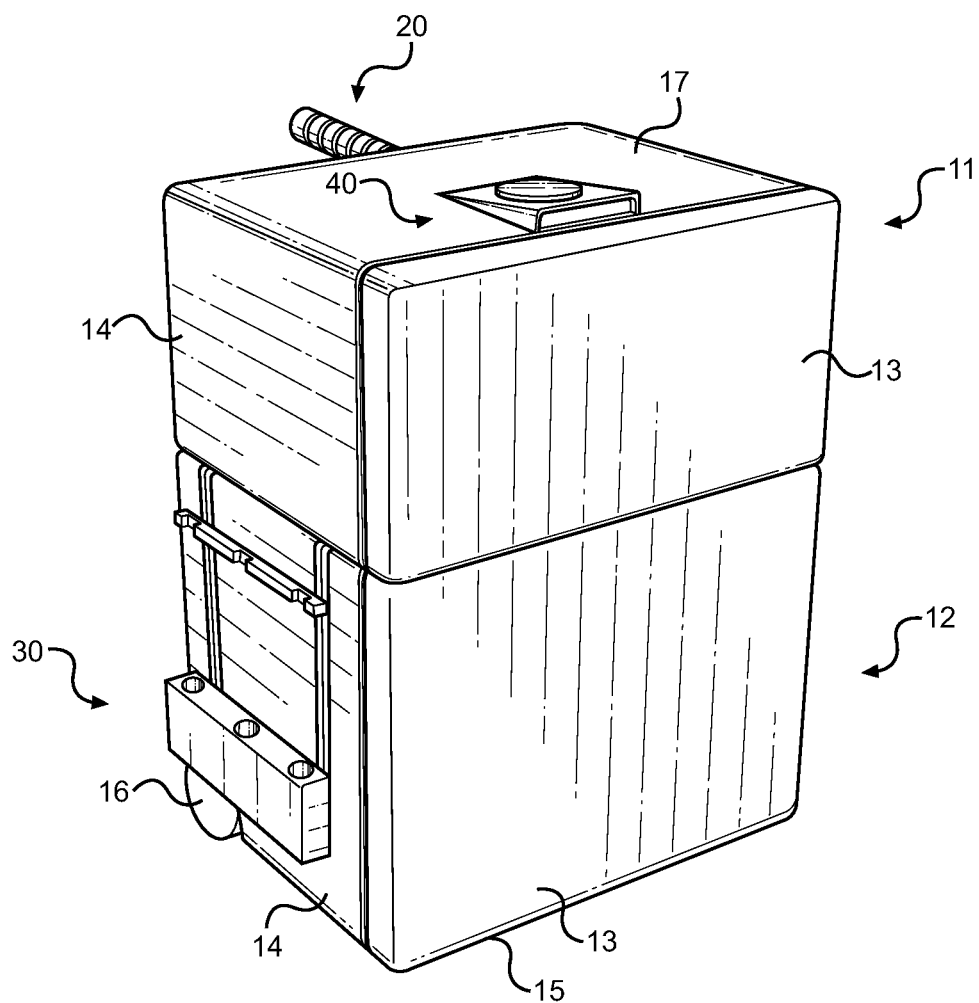
FIG. 1 shows a perspective view of the fishing equipment cooler device of the present invention.

Reference is made herein to the attached drawings. Like reference numerals are used throughout the drawings to depict like or similar elements of the fishing equipment cooler device. For the purposes of presenting a brief and clear description of the present invention, the preferred embodiment will be discussed as used for cooling items in two separated cooling chambers while fishing, and further for supporting fishing items along the exterior thereof. The figures are intended for representative purposes only and should not be considered to be limiting in any respect.

Referring now to FIG. 1, there is shown a perspective view of the fishing equipment cooler device of the present invention. The device comprises an upper cooler assembly 11 and a lower cooler assembly 12 that are attached to one another in a stacked configuration to provide separated storage of chilled items. Each of the cooler assemblies comprise an open interior volume bounded by sidewalls 14, an upper surface 17, a lower surface 15, and a forward cooler door 13. The walls of the cooler are insulated to reduce heat transfer into the interior volume and therefore maintain a low temperature when the cooler interior is filled with ice or ice blocks.

The cooler assemblies attach to one another using a connection mechanism therebetween, wherein the lower surface of the upper cooler assembly 11 secures to the upper surface of the lower cooler assembly 12. The two assemblies form a static relationship relative to one another when attached such that the device can be transported without the two coolers separating. To transport the coolers, the lower cooler assembly 12 comprises a set of roller wheels 16 along a lower edge thereof. Along the rear of the lower assembly 12 is an adjustable handle grip member 20. The handle grip 20 is grasped and the coolers are tipped over such that the device can be rolled from one location to another. This facilitates ease of transport when carrying several items in each cooler interior.

Along the exterior of at least one of the cooler assemblies is a fishing rod support member assembly 30. This assembly 30 is adapted to secure along the sidewall 14 of one of the cooler assemblies and support at least one upstanding fishing rod and reel. When the desired destination is reached, the cooler device will have served as a means to store food, bait, caught fish, as well as fishing supplies for the user. Along the upper surface of the upper cooler assembly 11 is also an optional light source 40, which projects outward in front of the cooler doors 13 such that a user can visualize items in low light conditions.

Figure 2:
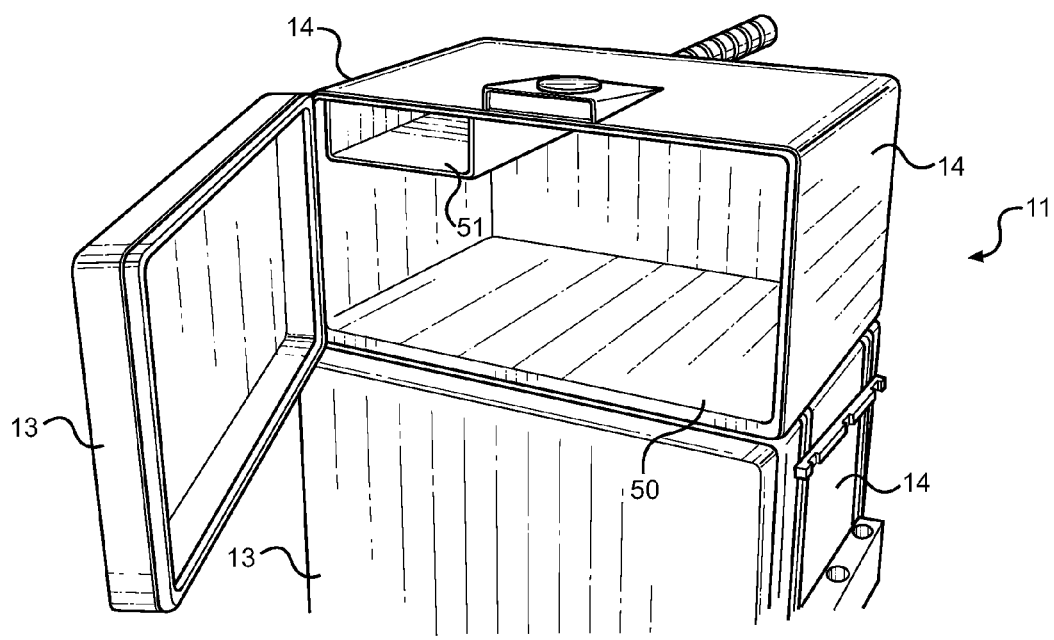
FIG. 2 shows a view of the upper cooler assembly in an open state.
Figure 3:
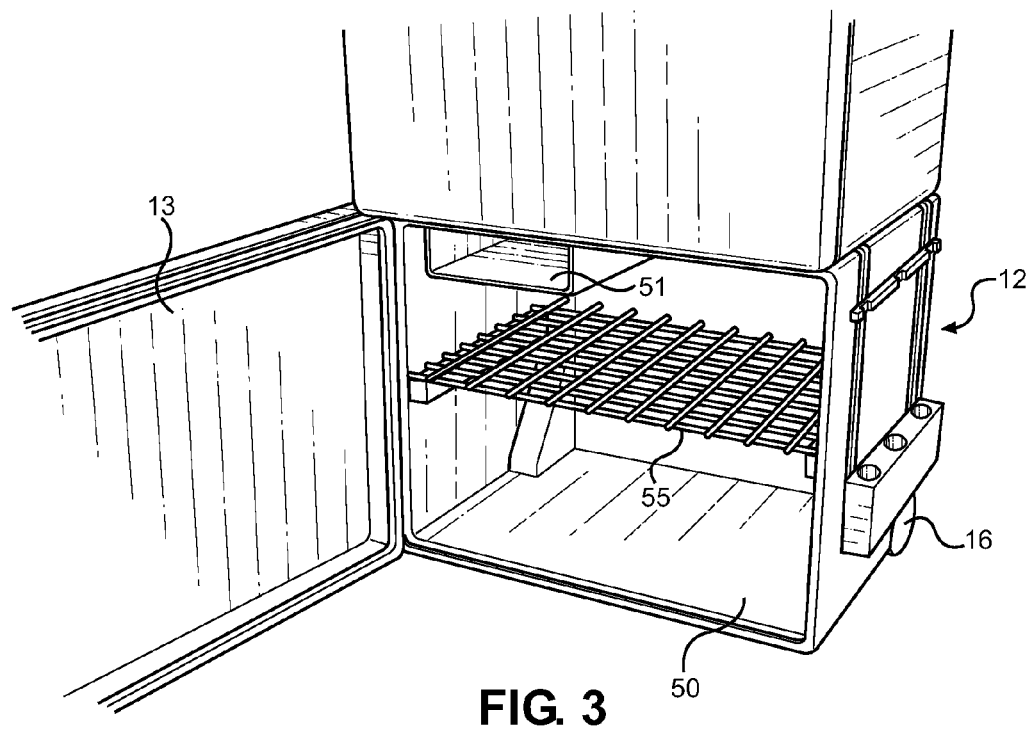
FIG. 3 shows a view of the lower cooler assembly in an open state.

Referring now to FIGS. 2 and 3, there are shown view of the upper cooler assembly 11 and lower cooler assembly 12 in an open state. Each of the cooler assemblies comprises a cooler door 13 that is hinged to a sidewall 14 thereof such that the interior volume 50 of the cooler is accessible. The interior 50 may be configured in a number of styles, including those having compartments 51, those with organizational shelving 55, and the like. The sidewalls 14 and cooler door 13 are insulated to maintain a low temperature inside the cooler when the same is filled with ice or ice blocks.

Figure 4:
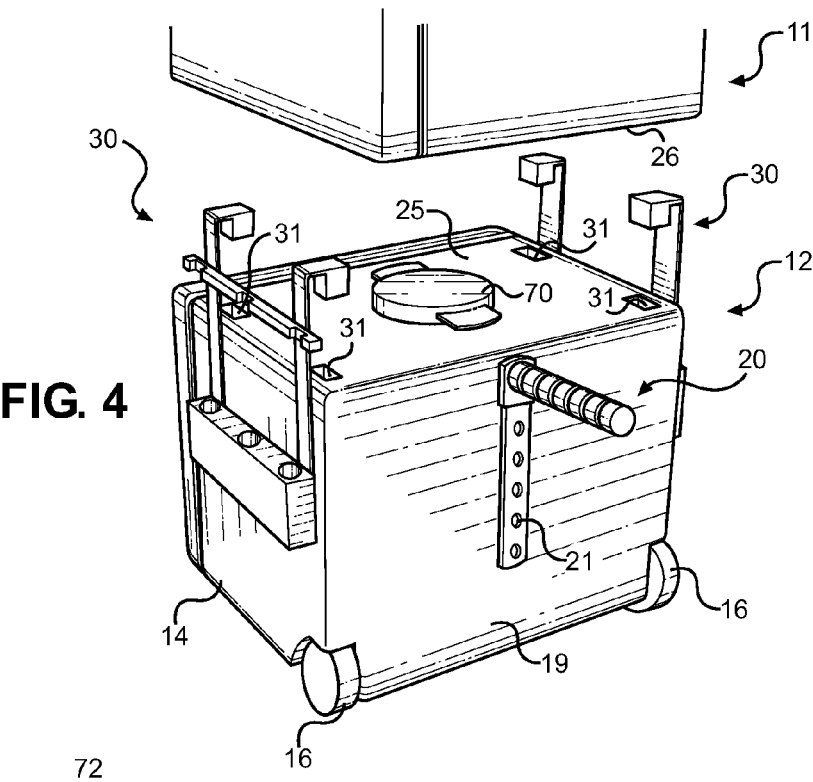
FIG. 4 shows a view of the connection between the upper and lower cooler assembly and the connection of the fishing rod support members.

Referring now to FIG. 4, there is shown an exploded view of the fishing equipment cooler device of the present invention. As shown, the upper cooler assembly 11 secures to the lower cooler assembly 12 using a turn latch 70 connection. The latch 70 is statically arranged on either the upper surface 25 of the lower cooler assembly 12, or arranged on the lower surface 26 of the upper cooler assembly 11, and engages an aperture in the opposing assembly. Once inserted into the aperture, the cooler supporting the latch 70 is rotated such that the wings of the latch are rotated within an enclosed portion of the aperture, thereby locking the two in a static configuration such that the two can be lifted and rolled together as one.

Further shown in FIG. 4 are the fishing rod support member assemblies 30 and their attachment to the lower cooler assembly 12. These assemblies 30 are adapted to nest within apertures 31 along the upper surface 25 of the lower cooler assembly 12 and be suspended along the sidewalls 14 thereof. The upper cooler assembly 11 is positioned thereover and locks the fishing rod support members 30 in place while the coolers are connected.

Furthermore, the lower cooler assembly 12 supports a set of roller wheels 16 along its rear surface 19, along with the handle grip member 20. The handle grip member 20 is an adjustable grip that is preferably slidably and lockably positioned within a sleeve 21, such that the height of the grip member 20 is adjustable. This allows the grip portion 20 to be positioned above the upper cooler assembly 11 when pulling or pushing the connected coolers using the roller wheels 16. The assembly therefore acts as a dolly and can be rolled over terrain to a desired location without lifting.

Figure 5:
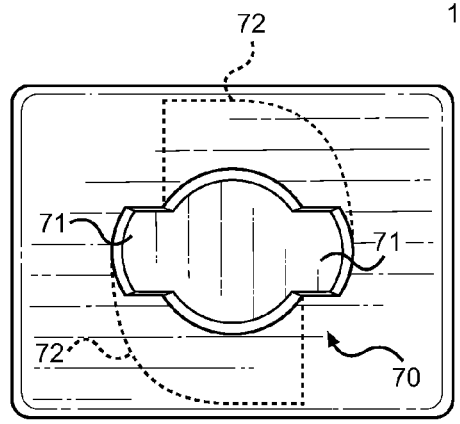
FIG. 5 shows a view of the connection between the upper and lower cooler assembly.

Referring now to FIG. 5, there is shown a view of the turn latch connection between the upper cooler assembly and the lower cooler assembly. The connection comprises a latch member 70 along one cooler assembly, whereby the latch member is adapted to be positioned within a specific aperture 72 in the adjacent cooler member. The latch member arms 71 engage the aperture and are accepted within enclosed portions thereof, thereby locking the two members together. This configuration is one contemplated embodiment of the connection mechanism between the two cooler assemblies. It is not desired to limit this connection to this exact configuration, but rather to disclose a novel, multi-chambered cooler device having separable cooler assemblies and means of supporting fishing gear.

Figure 6:
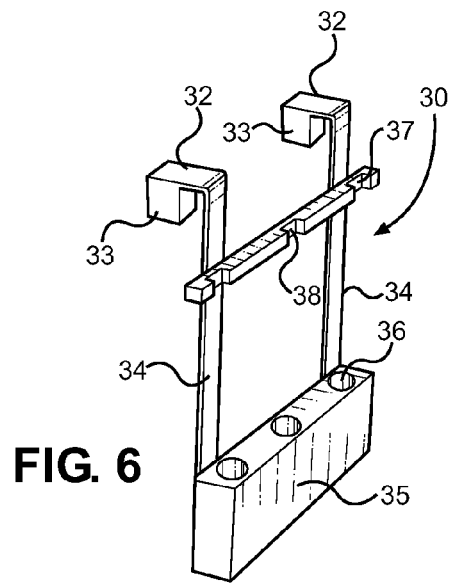
FIG. 6 shows a perspective view of a fishing rod support member adapted to secure to the sides of the fishing rod equipment cooler device.

Referring now to FIG. 6, there is shown a perspective view of the fishing rod support member 30 of the present invention. The fishing rod support member 30 is adapted to support the lower end of a fishing rod, and support the rod in a substantially upright state along the sidewalls of the coolers while in use. The upper portion of the member 30 comprises a first and second hook portion 33 that is received within a first and second aperture in the lower cooler assembly. The upper surface 32 of the hook portion is flat and adapted to rest in plane with the upper surface of the lower cooler assembly. The upper cooler assembly sandwiches the hook portion 33 in the apertures and prevents their removal while the coolers are connected.

Extending downward from the hook portions 32 are elongated vertical members 34 connected by a lower rod support shelf 35 and an upper rod support member 37. The lower rod support shelf 35 includes a plurality of apertures 36 that receive the lower ends of fishing rods therein, while the upper rod support member 37 includes recessed regions 38 aligned with the lower rod support shelf apertures 36. The recessed regions 38 receive the fishing rods along their length, whereby the entire assembly supports fishing rods in a vertical condition along the sides of the coolers.

Figure 7:
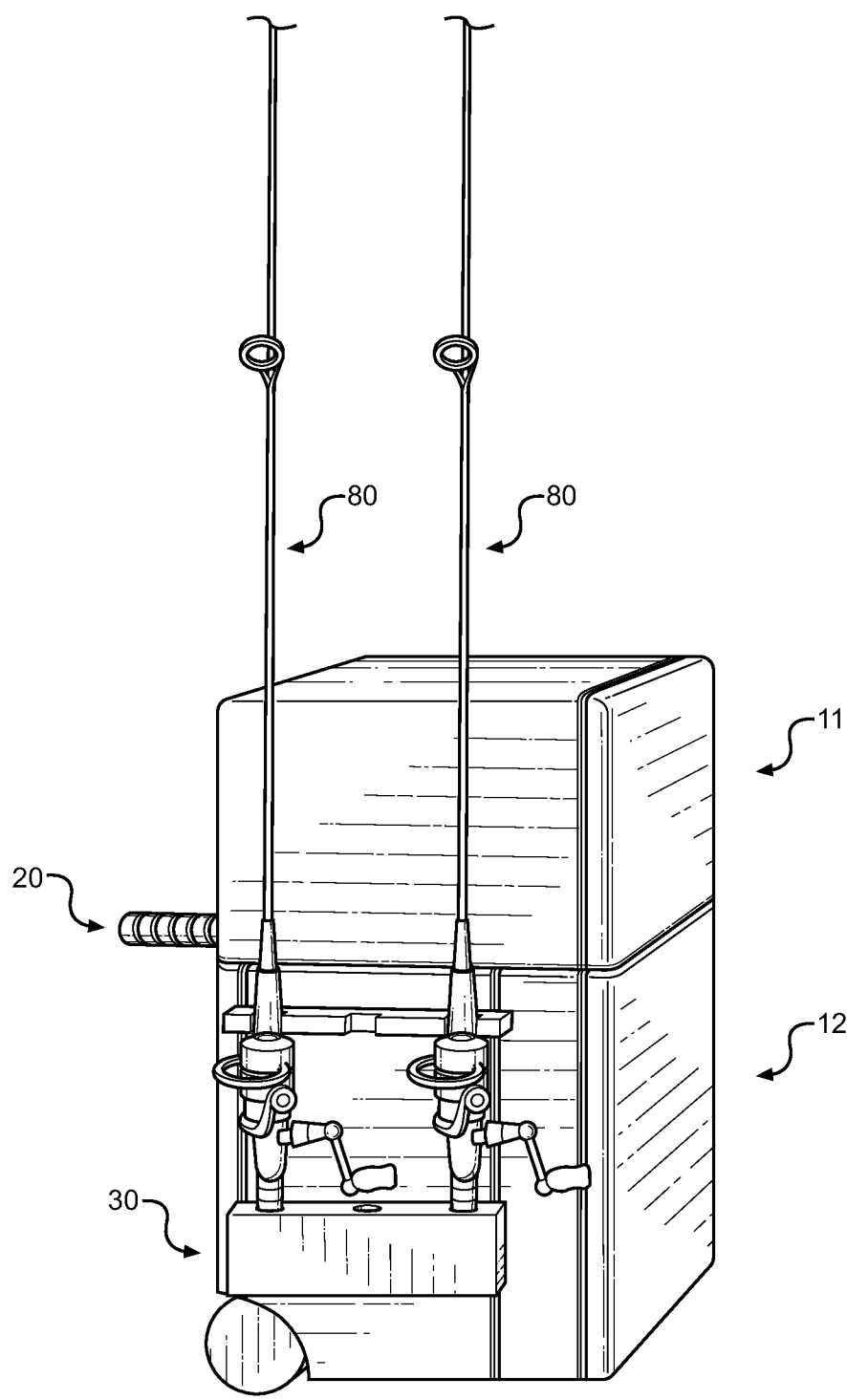
FIG. 7 shows a side view of the present invention in a working state, supporting a pair of fishing rods along its side.

Referring finally to FIG. 7, there is shown a view of the present invention in a working state, whereby fishing rods 80 are be supported by the fishing rod support member 30. The rods 80 are retained against the sides of the connected cooler assemblies 11, 12, while the user can freely grasp the handle grip 20 to roll the assembly to a desired location. Once on site, the coolers retain items in a chilled state within their respective interior volumes, whereby the upper 11 and lower 12 cooler assemblies can be used to store different types of products. These include food items for the fisherman, caught fish, bait, tackle, and other items requiring chilled, segregated, or general storage.

Coolers are useful for a large variety of outdoor events, including camping, sporting events, and fishing trips. Despite their usefulness, coolers tend to be quite disorganized and can be difficult to transport to and from the outdoor event. Coolers also tend to lack storage for additional items, such as fishing rods, which could further increase the utility of such devices. The present invention provides a cooler assembly that can be used to store different types of chilled items, while also carry fishing supplies and gear to a fishing site. Additionally, the device can comprise a solar-powered light source for convenient nighttime use.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing equipment cooler device, comprising:
    an upper cooler assembly;
    a lower cooler assembly;
    said upper cooler assembly and said lower cooler assembly each having sidewalls, an upper surface, a lower surface, and a forward cooler door enclosing an internal volume;
    said forward cooler door being rotatable between an open and closed position;
    each of said sidewalls, upper surfaces, lower surfaces, and forward cooler doors being insulated;
    said upper cooler assembly removably connected to said lower cooler assembly via removable connection, whereby said lower surface of said upper cooler assembly abuts against said upper surface of said lower cooler assembly;
    said lower cooler assembly having roller wheels and a handle grip member wherein said removable connection further comprises a turn latch member having latch member arms adapted to engage an aperture.

2. The fishing equipment cooler device of claim 1, comprising at least one fishing rod support member attachable along one of said sidewalls, each of said fishing rod support members configured to support a fishing rod in an upright condition.

3. The fishing equipment cooler device of claim 2, wherein said fishing rod support member further comprises:
- a first and second hook portion adapted to engage apertures along said upper surface of said lower cooler assembly;
- elongated vertical members extending downward from said first and second hook portion;
- a lower rod support shelf and an upper rod support member;
- said lower rod support shelf having a plurality of apertures therein to receive fishing rods therein;
- said upper rod support member having recessed regions aligned with said apertures of said lower rod support shelf.

4. The fishing equipment cooler device of claim 1, wherein:
- said aperture further comprises enclosed portions adapted to receive and secure said latch member arms when said turn latch member arms are rotated thereinto.

5. The fishing equipment cooler device of claim 1, wherein said handle grip member is height adjustable.

6. The fishing equipment cooler device of claim 1, further comprising a light source along said upper surface of said upper cooler assembly.

\* \* \* \* \*